United States Patent [19]

Prelini et al.

[11] Patent Number: 5,024,674

[45] Date of Patent: Jun. 18, 1991

[54] PROCESS FOR IMPROVING THE DYEABILITY OF WOVEN OR NON-WOVEN TEXTILES: PRE-TREATMENT WITH AQUEOUS DISPERSION OF POLYURETHANE CONTAINING RANDOM CATIONIC GROUPS

[75] Inventors: Cesare Prelini, Milan; Aldo Trovati, Novara; Tiziana Gambini, Castellanza; Vittorio Stefanoli, Busto Arsizio, all of Italy

[73] Assignee: Raffineria Olii Lubrificanti "R.O.L" S.p.A., Milan, Italy

[21] Appl. No.: 433,993

[22] Filed: Nov. 9, 1989

Related U.S. Application Data

[63] Continuation of Ser. No. 267,645, Nov. 4, 1988, abandoned, and Ser. No. 135,042, Dec. 18, 1987, abandoned.

[30] Foreign Application Priority Data

Dec. 24, 1986 [IT] Italy .............................. 22864 A/86

[51] Int. Cl.$^5$ .................. D06M 15/56; D06P 1/52; D06P 5/22; C08G 18/48

[52] U.S. Cl. ............................... 8/554; 8/543; 8/606; 8/680; 8/917; 8/918; 8/922; 8/924; 8/927; 8/928

[58] Field of Search ................ 8/554, 606, 543, 680

[56] References Cited

U.S. PATENT DOCUMENTS

| | | | |
|---|---|---|---|
| 3,686,108 | 8/1972 | Reiff et al. | 524/591 |
| 4,339,566 | 7/1982 | Rosenkrawz et al. | 8/115.63 |
| 4,367,307 | 1/1983 | Hirai et al. | 8/515 |
| 4,497,932 | 2/1985 | Trovati | 524/591 |

FOREIGN PATENT DOCUMENTS 167188 1/1986 European Pat. Off.
183119 6/1986 European Pat. Off.

Primary Examiner—A. Lionel Clingman
Attorney, Agent, or Firm—Stevens, Davis, Miller & Mosher

[57] ABSTRACT

Process for improving the dyeability of woven or non-woven textiles by treating them with an aqueous dispersion of polyurethanes containing in the macromolecule randomly distributed cationic groups, such as ammonium, in quantity between 15 and 100 milliequivalents for 100 grams of dry polyurethane, said treatment being carried out before dyeing.

11 Claims, No Drawings

PROCESS FOR IMPROVING THE DYEABILITY OF WOVEN OR NON-WOVEN TEXTILES: PRE-TREATMENT WITH AQUEOUS DISPERSION OF POLYURETHANE CONTAINING RANDOM CATIONIC GROUPS

BACKGROUND OF THE INVENTION

This application, as a continuing application claims the benefit of the prior U.S. application Ser. Nos. 267,645, filed Nov. 4, 1988, and Ser. No. 135,042, filed Dec. 18, 1987, both abandoned, and Italian application No 22,864 A/86, filed Dec. 24, 1986.

The present invention relates to a process for improving the dyeability of woven or non-woven textiles.

More particularly, the present invention relates to a process for improving the dyeability of woven or non-woven textile by the application of polyurethanes.

Processes for finishing and/or dyeing woven or non-woven textile materials are known in the art.

For instance, in "Coated Fabrics Technology" Technomic Publishing Co. (1973), "Urethanes as Textile Finishers," pages 109 to 120, W. G. Wolfgang, or in U.K. Patent Nos. 1,419,264 and 1,418,550, U.S Patent No. 3,709,864, and German patent No. 1,504,733, processes are described for improving the surface of textiles by impregnation and/or coagulation, which comprise the use of essentially linear polyurethanes dissolved in polar solvents, such as dimethylformamide, dimethylacetamide, and dioxane, optionally mixed with ketones, alcohols or aromatic hydrocarbons.

The above-mentioned polyurethane solutions generally need pigmentation before application with inorganic or organic pigments, since textile-manufactured articles must be dyed in a wide range of colors.

Drawbacks of these methods of treatment are:

(a) the need for working in the presence of a solvent which is flammable and causes environmental pollution;

(b) the need for frequent changes of color and therefore frequent difficult cleaning operations of the apparatus; and (c) the manufacture of articles generally characterized by lower performances in terms of color and drywashing fastness.

An alternative to the above-mentioned methods (J. M. Miley and P. D. Moore, "Reactive Polymeric Colorants for Polyurethane,"Proceedings of the S.P.I. 26th Annual Technical Conference, San Francisco, CA, 1981, pages 83–89), that has been suggested comprises the use of polyurethanes obtained by using polyols containing chromophoric groups chemically linked in the chain. However, in this method the dyeing treatments are not free of the above-mentioned drawbacks, especially those mentioned under points (a) and (b), in that the polyurethanes which can be obtained from these polyols are always used in solvents.

THE PRESENT INVENTION

It has now been discovered, and it is the object of the present invention, that the above-mentioned drawbacks may be overcome by a process for improving the dyeability of woven or non-woven textiles comprising treating these manufactured articles, before the dyeing, with an aqueous dispersion of polyurethanes comprising cationic groups randomly distributed in the macromolecule. Preferred aqueous dispersions are those in which the polyurethanes contain cationic groups of the ammonium type in a of between 15 and 100 milliequivalents per 100 g of polyurethane.

Alternatively, the aqueous dispersions may comprise cationic polyurethanes comprising side or end polyether chains, preferably polyoxyethylene chains, which produce characteristics of thermocoagulability and higher resistance to electrolytes. Also in this case the cationic groups are present in quantity in a the range of from 15 to 100 milliequivalents per 100 grams of dry polyurethane.

The above-mentioned side or end polyether chains have an average molecular weight from 500 to 2,000, and preferably from 500 to 1,000, and are present in amounts between 4% and 15% by weight based on the dry polyurethane.

Polyurethane dispersions employed according to the present invention are those having a solids content higher than 10% by weight, and preferably between 10 and 50% by weight.

Polyurethane dispersions used in the process of the present invention may be applied onto the textile materials by known techniques such as air-knife or roller coating, printing, spray, impregnation, coagulation or the so-called "transfer coating", in such a manner that the polyurethane may act both as a binder and as a dyeing aid with a specified class of dyestuffs.

The drying of the a textile article treated with the polyurethane dispersion is carried out in a hot air stream, preferably at a temperature of between 80° and 120° C., the article then being further heat-treated at a temperature between 130° and 160° C., for 1 to 5 minutes.

In the case of textiles based on cellulose fibers, one may use hydrodispersed polyurethanes obtained by an exhaustion technique and add the dispersion with organic and inorganic acids in not high concentrations, such as for instance less than 2 g/l.

In this case, the treatment is carried out preferably in an apparatus providing treatment bath circulation at a temperature from 30° to 70° C. until the dispersion is fully exhausted (20–60 minutes).

The thus-treated manufactured articles are then dried at temperatures between 30° and 130° C.

In the event of yarns based on cellulose fibers treated with polyurethane dispersions according to the process of the present invention, the same yarns can be used for the fabrication of woven or non-woven textile articles in the presence of cellulosic yarns or other types of yarns which have not been treated.

The subsequent dyeing operations are carried out by known techniques such as for instance, exhaustion dyeing, pad-batch, pad-roll, pad-stream, etc.

Textile articles useable in the application of the present invention are those based on natural fibers, such as wool, cotton, linen, silk, etc., or based on artificial fibers such as for instance regenerated cellulose fibers, or based on synthetic fibers such as acrylics, polyamides, polyesters, polyolefines, etc., or based on mixed fibers.

Advantages derived from the polyurethane dispersions used in the present process are:

(1) the polyurethanes are of the hydrodispersed type, substantially free from organic solvents, and stable in the presence of cationic groups distributed along the macromolecule;

(2) the dyeing operations of the manufactured article are subsequent to the treatment with the hydrodispersed polyurethane, so that it is possible to prepare a large stock of treated fabrics which can be dyed successively with the desired colors, thus avoiding difficult and time-consuming cleaning operations due to the change of color;

(3) the colorfastness to washing and to dry cleaning are generally very good due to the good characteristics of mechanical and hydrolytic resistance of the polyurethane, and due to the high affinity that the cationic polyurethane shows which respect to anionactive dyestuffs of the acid type, premetalized 1:1, premetalized 1:2, reactive chromium-based. Good dyeing properties are obtained also by a selection of direct dyestuffs; and (4) the possibility of using the same types of dyestuff independent of the nature of the substrate, which may consist of mixtures of fibers (cellulose, polyamide, polyester, polypropylene fibers, etc.), since the affinity of the dyestuffs particularly favors the polyurethane.

Aqueous dispersions of polyurethane containing cationic groups, preferably of the ammonium type in the macromolecule, may be obtained according to any of the known processes, such as for instance those described in U.S. Pat. No. 3,686,108 or in European Patent Application No. 98,752. According to these processes, organic diisocyanates of the general formula:

$$OCN-R-NCO \qquad (I)$$

wherein R is an aliphatic, cycloaliphatic, or aromatic radical containing from 4 to 18 carbon atoms, are reacted with a mixture consisting of at least one macroglycol and at least one diol containing a cationizable atom, preferably a nitrogen atom.

Any diisocyanate of the general formula (I) may be used for preparing the polyurethane dispersions used in the dyeing process of the present invention, although aliphatic and cycloaliphatic diisocyanates are preferred.

Examples of particularly suitable diisocyanates for the preparation of the polyurethane dispersions are: tetramethylenediisocyanate, 1,6-hexanediisocyanate, cyclohexane-1,3 and -1,4 diisocyanate, 1-isocyanato-3-isocyanatomethyl-3,5,5-trimethylcyclohexane, 4,4'-diisocyanato-dicyclohexylmethane, etc;

As macroglycols, compounds having molecular weights between 500 and 3,000, and preferably between 800 and 2,000 may be used, these compounds being based on:

(1) dihydroxylated polyesters obtained by the polycondensation of aliphatic and aromatic dicarboxylic acids or anhydrides, such as succinic, adipic, sebacic, azelaic, phthalic, isophthalic, terephthalic acids or anhydrides, with glycols such as ethylene or propylene glycol, 1,3- and 1,4-butanediol, 1,6-hexanediol, neopentyl glycol, etc., and optionally mixtures thereof.

(2) dihydroxylated polyethers, such as polymers and copolymers of ethylene oxide, propylene oxide, tetrahydrofuran, butylene oxide and epichlorohydrin, obtained by the polyaddition on diol starters of bisphenols;

(3) polycaprolactones obtained by the polyaddition of ε-caprolactone on diol starters; and (4) polycarbonates obtained the phosgenation of the above-mentioned diols.

Preferred products are macroglycols of the polyester type and polyethers derived from tetrahydrofuran.

Preferred diols containing cationizable atoms are those of the following general formulae:

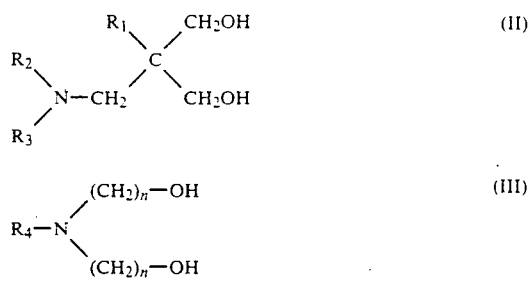

where $R_1$ is an alkyl radical containing 1-5 carbon atoms, $R_2$ is a $C_1$-$C_4$ alkyl radical, $R_3$ is a $C_1$-$C_{18}$ alkyl radical, $R_4$ is a $C_1$-$C_{12}$ alkyl radical, and n is an integer between 1 and 4.

Examples of suitable diols are: 2-methyl-2-dimethylaminomethyl-1, 3-propanediol; 2-methyl-2-diethylaminomethyl-1,3-propanediol; 2-ethyl-2-dimethylaminomethyl-1,3-propane-diol; 2-ethyl-2-diethylaminomethyl-1-3-propanediol; methyl-diethanolamine; methyl-dimethanolamine; ethyl-dimethanolamine; ethyl-diethanolamine, etc.

According to the present invention, diisocyanates, macroglycols and the above-mentioned diols are reacted in such a manner as to have a ratio between NCO and OH groups between 1.2 and 2.5, and preferably between 1.3 and 1.7.

The reaction temperature is preferably kept below 150° C.

The thus-obtained polyurethane is subjected to a cationizing action by treatment with aqueous solutions of organic or inorganic acids, such as for instance acetic acid, chloroacetic acid, formic acid, phosphoric acid, sulfuric acid, hydrochloric acid, etc., or by treatment with any cationizing substances such as alkyl halides of the type of methyl iodide, ethyl bromide, n-butyl chloride etc., or dialkyl sulfates of the type of dimethyl sulfate, etc.

Cationizing agents may be used in solution of suitable solvents, preferably miscible with water, such as acetone, methyl-ethylketone, tetrahydrofuran, etc.

The above-mentioned cationizing agents are used in equivalent quantities calculated on the total of the cationizable atoms.

The aqueous dispersions of polyurethanes also containing side or and polyether chains in the macromolecule may be obtained according to the process described in European Patent Application No. 98,752 with the modification for introducing the polyether chains in side or end position. The introduction of these chains is carried out using monofunctional polyethers prepared according to the processes described in U.S. Pat. Nos. 3,905,929, 3,920,598, and based on the alkoxylation of monovalent alcohols, such as methanol and butanol with ethylene and/or propylene oxide.

The molecular weight is between 500 and 2,000, and preferably between 500 and 1,000.

Examples of monofunctional polyethers are the methyl or butyl monoethers of polyoxyethylene glycol as such or copolymerized with propylene oxide.

Their incorporation in the polyurethane is preferably carried out simultaneously with the functionalization of the polyisocyanate prepolymer during the reaction with hydroxyalkyl acrylates as in the process of the cited European Patent Application.

In particular, this process comprises the following operative steps:

(a) a mixture consisting of diol-containing cationizable groups and of an essentially linear macroglycol, having a molecular weight between 500 and 5,000, of the type polyether-polyol and/or polyester polyol, is reacted at a temperature not higher than 100° C. with an excess of diisocyanate (ratio —NCO/—OH in equivalents between 1.2 and 3), thus obtaining a propolymer containing free isocyanate groups;

(b) the polyisocyanate prepolymer is then transformed into an oligourethane containing ethylenically unsaturated end groups, by reaction with a compound containing hydroxyl groups reactive with the isocyanate group and having the following general formula:

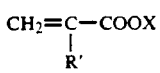

wherein R' is H or $CH_3$, X is a hydroxyalkyl radical, and with the monofunctional polyethers in molar amounts less than 10%;

(c) the thus-obtained oligourethane is subjected to a salification treatment, which transforms the tertiary nitrogen atoms into hydrophilic ammonium cations; and (d) the unsaturated dispersed oligourethane is polymerized in an aqueous dispersion, in the presence of free radical catalysts, at a temperature not higher than 100° C., to obtain an aqueous dispersion of polyurethane containing polyether side or end chains with a predetermined degree of reticulation adjusted by the optional addition of comonomers during the polymerization.

In order to still better understand the present invention and to practically perform the same, some illustrative but not limitative examples are reported below.

EXAMPLE 1

Into a reactor provided with a stirrer, and a cooler and kept under a dry nitrogen atmosphere dipped in an oil bath with a temperature regulation, 1061.8 g (1.302 moles) of a polyester from adipic acid and a 50/50 by weight mixture of ethylene glycol/1.4 butanediol (OH number=137.6 mg KOH/g; acidity number=0.2 mg KOH/g) and 72.67 g of granulated urea are introduced. The heterogeneous mixture is dehydrated by heating at 110° C. under reduced pressure (about 10 mm Hg). After cooling at about 45° C., 25.26 g (0.212 moles) of methyldiethanolamine, 0.3 g of benzoyl chloride, and 355.77 g (2.117 moles) of 1,6-hexanediisocyanate are added.

The reaction mixture is heated up to 135° C. gradually and over 120 minutes and is maintained at the temperature for a further 60 minutes. After adding 135 g of butoxyethanol and cooling to about 115°–120° C., the salification is carried out by adding within 15 minutes a solution of 20.8 g of phosphoric acid in 640 g of deionized $H_2O$ under efficient agitation. A further 560 g of deionized $H_2O$ are then added, and the whole mixture is kept at a constant temperature of 60° C. Thereafter, 181.6 g of 36% aqueous formaldehyde diluted in 236 g of deionized water are added; a further 710 g of deionized water are added; the temperature is gradually raised to 90° C. and the whole is maintained at the temperature for 60 minutes. The thus-obtained milky-like dispersion has a solids content of 40% by weight; and the cationic polyurethane has a quaternary ammonium group content of 13.3 milliequivalents per 100 g dry polyurethane.

EXAMPLE 2

The apparatus is similar to that used in Example 1. 1282.3 g (1.322 moles) of a polyoxytetramethyleneglycol (a commercial product manufactured by DuPont under the registered trade name Terathane 1000) having a hydroxyl number=115.7 mg KOH/g, acidity number=0.2 mg KOH/g, are dehydrated under vacuum, as described in Example 1. At about 40° C., 70.48 g (0.592 moles) of methyl-diethanolamine, 0.7 g of benzoyl chloride, and thereafter 424.95 (2.529 moles) of 1,6-hexanediisocyanate are added. The exothermic reaction is controlled so that the mass stays for 1 hour at about 60° C.; then the mass is heated at 80° C. until the content of free isocyanate groups is about 3.1-3.2%. The nitrogen atmosphere is replaced by dry air, the whole mixture is thermostatized at 65° C., and 213.06 g (0.262 moles) of an ethoxylated butanol having a hydroxyl number of 68.8 mg KOH/g and 51.17 g (0.394 moles) of 2-hydroxypropylacrylate are added. The whole mixture is kept at 65° C. until the content of free isocyanate groups is 1.35-1.38%. The mass is diluted with 534 ml of acetone and then the salification is carried out by adding 32 g of 85% formic acid (0.591 moles) diluted in 680 g of deionized water. A further 3,320 g of deionized water are added and the acetone is removed by distillation under reduced pressure. The dispersion of the oligourethane thus obtained is placed again under nitrogen, thermostatized at 50° C. and polymerized by contemporaneous addition within 2 hours of the initiator (ter-butylhydroperoxide 12% in water, 35.05 g in 115 g of deionized water) and the activator (2.09 g of sodium-formaldehydesulfoxylate in 150 g of deionized water).

The final dispersion has a dry solids content of 32.8% by weight, and consists of a polyurethane containing 28.1 milliequivalents of quaternary ammonium groups and 9.2% by weight of polyoxyethylene chains, calculated on the dry polyurethane.

EXAMPLE 3

A 100% cotton fabric, having a weight of 150 g/m², size 30×35 cm, is impregnated with a solution of 100 g/l of hydrodispersed polyurethane (described in Example 1) at 30% of dry content, then is squeezed to have an 80% absorption, thereafter dried at 120° C. and then treated at 150° C. for 2 minutes. A deposit of 36 g/m² of the polyurethane resin is thus obtained.

10 g of the thus-prepared fabric are dyed in an exhaustion bath according to the following procedure:

(a) a bath of 400 ml of purified water is prepared containing:

0.0048 g of C.I. Acid Blue 193
0.1 g of ammonium sulfate
0.2 ml of acetic acid.

(b) the bath is controlled at a pH of 4.5–5;

(c) the material to be dyed is introduced at 40° C. and the bath temperature is raised to 80° C. by raising same 1 centigrade degree each minute;

(d) this temperature is maintained for a further 60 minutes in order to favor the diffusion of the dyestuff into the resin;

(e) the whole mixture is cooled to 70° C. and a new bath is prepared containing 0.5 g/l of an anionic detergent (Diapon TN);

(f) the fabric is washed with this new bath at 70° C. for 10 minutes; and (g) the fabric is rinsed out in pure warm water and is dried at a temperature of about 80° C.

The polyurethane resin in perfectly dyed, the cotton itself remaining white. The dyeing fastness data are reported in Table 1.

EXAMPLE 4

A 100% cotton fabric, having a weight of 160 g/m$^2$, size 30×50 cm, is coated by the well known floating knife technique, such as is described by John A. Pasquale III in the Journal of Coated Fabrics, 15, 263-274 (April 1986), with hydrodispersed polyurethane having 30% of dry solids content as described in Example 1, previously thickened with 2.5%, based on the latex, of Borchigel L/75 (non-ionic thickening agent).

The thus-treated fabric is dried at 120° C. and is then treated at 150° C. for 2 minutes to complete the film formation. In this way, a disposition of 35 g/m$^2$ of polyurethane resin is obtained.

A sample of this fabric, size 15×30 cm, is padded with the following dyeing bath, squeezing between two rolls to obtain an 80% absorption:

500 ml of purified water
100 g of technical urea
10 g C.I. Reactive Blue 94
10 g sodium metabisulfite
2 g Imbirol TO/Na/45 (wetting agent sold by Montedison).

The pH is adjusted at 4.5-5 with acetic acid and diluted to 1,000 ml with purified water.

The thus-impregnated fabric is rolled up on a glass bar, wound up with a polyethylene film, and kept at room temperature for 24 hours.

The fabric is then washed with water at 50° C., and thereafter is washed a second time at 70° C. with a solution of 1 g/l of sodium carbonate for 10 minutes.

It is then rinsed with warm purified water (50° C.), then with tepid water at a pH of 5 acidified with acetic acid, and finally the fabric is dried.

The polyurethane resin is perfectly dyed, while the cotton remains white. The fastness dyeing data are reported in Table 1.

EXAMPLE 5

A cotton fabric, having weight of about 120 g/m$^2$ and size 50×60 cm, is screen-printed, with drawings or designs covering 40% of the fabric surface and with a 70% absorption, using the following printing paste:

100 parts by weight of hydrodispersed polyurethane (30% of dry solids) as described in Example 1; and 2 parts of Borchigel L/75 (non-ionic thickening agent).

The print is dried at 120° C. and then is treated at 150° C. for 2 minutes. In this way a deposit of polyurethane resin of about 25 g/m$^2$ is obtained in the printed spaces.

From the thus-prepared printed material, a 10 g sample is taken and an exhaustion dyeing is carried out according to the following procedure:

(a) a bath of 400 ml of purified water is prepared containing:

0 0168 g of C.I. Reactive Red 100;
0.2 ml of Dispergal LAC (leveling dispersing agent sold by Montedison); and
acetic acid in amount sufficient to provide a pH of 4.5-5;

(b) the material to be dyed is introduced at 40° C. and the temperature is raised to 80°-85° C. within 20 minutes;

(c) the fabric is maintained at this temperature for about 40 minutes to exhaust the bath;

(d) without further heating, 2 ml/l of ammonium hydroxide are added to obtain the discharge and washing of the non-fixed dyestuff; and (e) the fabric is washed with water at 50° C. and then is rinsed with cold water slightly acidified with acetic acid.

In this way, the drawings or designs printed with polyurethane resin are perfectly dyed while not affecting the non-impregnated cotton. The dyeing fastness data are reported in Table 1.

EXAMPLE 6

A napped and sheared 100% cotton fabric having a weight of 220 g/m$^2$, size 40×60 cm, is coated on the napped surface with polyurethane hydrodispersed resin of Example 2, by the transfer technique by means of paper, to obtain a leather imitation.

The process is carried out as follows:

(a) a sufficiently thick paste is prepared adding to 100 parts of hydrodispersed emulsion (30% dry) obtained according to Example 2, 5 parts of Borghigel L/75 (non-ionic thickening agent);

(b) this paste is coated by means of a doctor blade on a release paper of the URECAST BNS+RASO paper sold by CARTIERE BINDA of Milan, having a thickness of 0.20 mm;

(c) the coated paper is dried at 120° C.;

(d) the film supported on paper is coupled with the cotton fabric by means of a heated press at 90°-100° C. The fabric is removed from the paper and is treated at 150° C. for 2 minutes.

In this way, an imitation leather is obtained showing the relief drawing or design of the paper employed and having a quantity of deposited polyurethane equal to 35 g/m$^2$.

A 20×20 cm sample of this imitation-leather treated fabric is subjected to the following dyeing process:

(a) a bath of 400 ml of purified water is prepared containing:

0.0028 g of C.I. Acid Red 362
0.1 g of ammonium sulfate
0.2 ml of acetic acid (b) the bath is controlled so that the pH of the bath is 4.5-5;

(c) the material to be dyed is introduced at 40° C. and the bath temperature is raised to 80° C., the temperature increase being 1 centigrade degree each minute;

(d) this temperature is maintained for a further 60 minutes to favor the diffusion of the dyestuff in the polyurethane;

(e) the whole is cooled to 70° C. and a new bath is prepared containing 0.5 g of an anionic detergent (Diapon TN);

(g) the fabric is washed with this latter bath at 70° C. for 10 minutes;

(h) the fabric is rinsed with slightly warm purified water and is dried at about 80° C.

The polyurethane portion, which consists of the imitation-leather, is perfectly dyed, while the cotton support remains white. Dyeing fastness data are reported in Table 1.

EXAMPLE 7

A 100% polyamide-6,6 fabric having a weight of 120 mg/m$^2$, and size 40×60 cm, is coated by a blade with the hydro-dispersed polyurethane described in Example 2, having 30% dry substance, previously thickened with 2.5% of Borchigel L/75 (non-ionic thickening agent).

The thus-obtained fabric is dried at 120° C. and thereafter is treated at 150° C. for 2 minutes, to complete the formation of the film. A deposit of 35 g/m² of polyurethane resin is thus-obtained.

A 5 g sample of the thus-obtained manufactured article is separated and the dyeing and polyurethane deposition is carried out by working as follows:

(a) 400 ml of purified water is prepared containing:
0.044 g of Reactive Black 5 adjusted to a pH of 3.5-4 with acetic acid;

(b) the treated fabric is introduced into the bath and dyeing is started at 40° C.;

(c) the bath is slowly heated raising the temperature up to 80°-85° C. over 30 minutes. This temperature is maintained for a further 30 minutes (until the bath is exhausted);

(d) then the pH of the bath is adjusted to a value of about 6-7 by adding sodium bicarbonate and is maintained at this pH for 20-30 minutes;

(e) a washing and soap-treatment followed with 0.6 g/l of Diapon T at 50° C., and then the fabric is rinsed and dried.

In this way a blueish-black dyeing of the deposited resin is obtained without affecting the polyamide fibers. Dyeing fastness data are reported in Table 1.

EXAMPLE 8

A 100% polypropylene fabric of the weight of 140 g/m², and size 50×60 cm, is printed with drawings or designs covering 35% of the fabric surface and with an 80% absorption using the following printing paste:

100 parts of hydrodispersed polyurethane 30% dry solids (as described in Example 2) 2.5 parts of Borchigel L/75 (non-ionic thickening agent).

The print is dried at 120° C. and is then treated for 2 minutes at 150° C. A polyurethane resin deposition of 24 g/m² on the printed paste is obtained.

From the thus-obtained print a sample of 30×50 cm is removed and is dyed in a laboratory jigger (which is a conventional apparatus for the discontinuous dyeing of fabrics) by the following method:

(a) 500 ml of aqueous dyeing bath is prepared containing:
0 0118 g of C.I. Acid Violet 90
0.1 g of ammonium sulfate
0.2 ml of acetic acid;

(b) the pH of the bath is controlled at 4.5-5;

(c) the bath is added in two separate portions to the apparatus containing the fabric (250 ml at the first run, 250 ml at the second run) at a temperature of 40° C.;

(d) the temperature is slowly raised (1 degree Centigrade each minute) to 80° C.;

(e) this temperature is maintained for a further 60 minutes;

(f) the whole is cooled to 70° C. and a bath is prepared containing 0.5 g/l of anionic detergent (Diapon TN);

(g) the fabric is washed with this new bath at 70° C. for 10 minutes and is rinsed in warm and then in tepid purified water; and (h) the fabric is dried at about 80° C.

A fabric is obtained with a colored print on a naturally white background. The dyeing fastness data are reported in Table 1.

TABLE 1

| Example No. | Fastness | | |
| --- | --- | --- | --- |
| | Xeno Light (ISO 105-BO2) | Wet Washing (ISO 102-CO2) | Dry Washing (ISO 105-DO1) |
| 3 | 4/5 | 4 | 4/5 |
| 4 | 3/4 | 4 | 4/5 |
| 5 | 5/6 | 4/5 | 4/5 |
| 6 | 4/5 | 4 | 4/5 |
| 7 | 3/4 | 4 | 4/5 |
| 8 | 4/5 | 4 | 4/5 |

EXAMPLE 9

In order to show the unpredictability of the present invention the following test was carried out:

The composition of Example 3 of Trovati U.S. Pat. No. 4,497,932 was prepared starting from:
polyester (see Example 1 of '932): 263.16 g
dimethylolpropionic acid: 14.74 g
hexamethylenediisocyanate: 57.96 g
butanediolmonoacrylate: 28.55 g
dimethylethanolamine: 7.84 g
ter-butylhydroperoxide (sol 10% by weight): 14.89 g
deionized water: 558.37 g and by using the same conditions as in Example 1 of Trovati '932.

The final dispersion has a content of solids of about 39% and of anionic groups of about 30 meq/100 g of dry substance.

A 100% cotton fabric having a weight of 150 g/m²; size 30×35 cm, was impregnated with a solution of 100 g/l of the hydrodispersed polyurethane, prepared as above, at 30% of dry content, then was squeezed out to have an 80% absorption, and thereafter was dried at 120° and then at 150° C. for 2 minutes.

A coating of about 35 g/m² of polyurethane resin was thus obtained. 10 g of the thus-prepared fabric are dyed in a exhaustion bath according to the following process:

(a) a bath of 400 ml of purified water is prepared containing:
0.0048 g of C.I. Acid Blue 193
0.1 g of ammonium sulphate
0.2 ml of acetic acid;

(b) the pH of the bath is kept at 4.5-5;

(c) the material to be dyed is introduced at 40° C. and the bath temperature is raised to by raising the same at the rate of one Centigrade degree per minute; and (d) this temperature is maintained for a further 60 minutes in order to favor the diffusion of the dye in the fabric.

At the end of this period the dyeing bath was not exhausted and the fabric was not dyed uniformly. After a washing with tepid water, the fabric completely released all the dye.

What is claimed is:

1. Process for improving the dyeability of a woven or non-woven textile article which comprises treating the textile article, before dyeing, with an aqueous dispersion of polyurethanes comprising in the macromolecule cationic groups randomly distributed in amounts ranging from 15 to 100 meq per 100 g of dry polyurethane.

2. Process for improving the dyeability of a woven or non-woven textile which comprises treating the textile article, before dyeing, with an aqueous dispersion of polyurethane comprising in the macromolecule cationic groups randomly distributed and polyoxyethylene side or end chains.

3. Process according to claim 2 wherein the cationic groups are of, the ammonium type and are contained in the macromolecule in quantities between 15 and 100 milliequivalents per 100 grams of dry polyurethane.

4. Process according to claim 2, wherein the polyoxyethylene side or end chains have an average molecular weight between 500 and 2,000.

5. Process according to claim 2, wherein the polyoxyethylene chains consist of methyl or butyl monoethers of polyoxyetayleneglycol homopolymerized or copolymerized with propylene oxide.

6. Process according to claim 2, wherein the polyoxyethylene side or end chains are present in quantities between 4 and 15% by weight calculated on the dry polyurethane.

7. Process according to claim 1 or 2, wherein the polyurethane aqueous dispersion has a solids content higher than 10% by weight.

8. Process according to claim 1 or 2, wherein the polyurethane aqueous dispersion has a solids content between and 50% by weight.

9. Process according to claim 1 or 2, wherein the woven or non-woven textiles are based on natural fibers selected from the group consisting of wool, cotton, linen, and silk, or an artificial fibers selected from the group consisting of regenerated cellulosic fibers, acrylic, polyamide, polyester, polyolefin fibers, and mixtures thereof.

10. Process for improving the dyeability of a woven or non-woven textile article which comprises treating the textile article with an aqueous dispersion of polyurethanes comprising in the macromolecule cationic groups randomly distributed in amounts ranging from 15 to 100 meg per 100 g of dry polyurethane and polyoxyethylene side or end chains, to coat the fibers of the textile article with polyurethane; and then dyeing the textile article.

11. A dyeable woven or non-woven textile treated with an aqueous dispersion of cationic polyurethanes according to the process of claim 1 or 2 or 10.

* * * * *